April 14, 1925.
L. V. LEWIS
1,533,322
BRAKE VALVE DEVICE
Filed Nov. 17, 1923
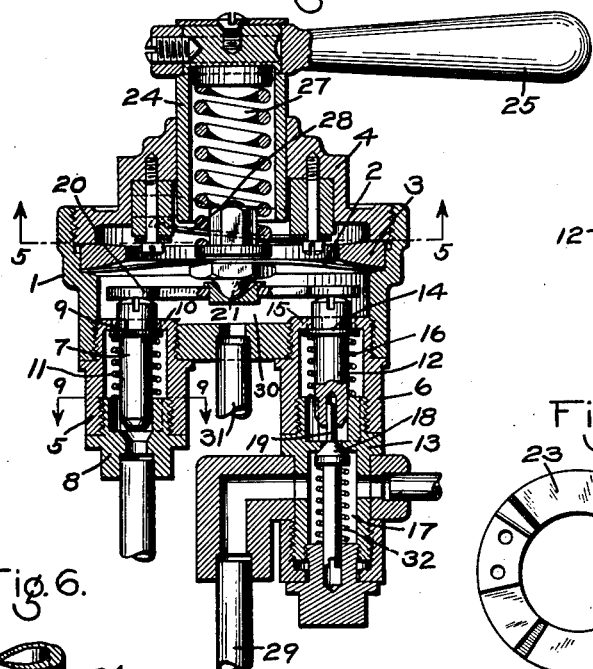
INVENTOR
LLOYD V. LEWIS
BY Wm. M. Cady
ATTORNEY Patented Apr. 14, 1925.                                                      1,533,322

UNITED STATES PATENT OFFICE.

LLOYD V. LEWIS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed November 17, 1923. Serial No. 675,249.

*To all whom it may concern:*

Be it known that I, LLOYD V. LEWIS, a citizen of the United States, residing at Edgewood, in the county of Allegheny and State of Pennsylvania, have invented new and useful Improvements in Brake-Valve Devices, of which the following is a specification.

This invention relates to brake valve devices, and more particularly to the type in which the fluid pressure is regulated according to the degree of compression of a spring.

The principal object of my invention is to provide an improved brake valve device of the above character.

In the accompanying drawing; Fig. 1 is a central sectional view of a brake valve device constructed in accordance with my invention; Fig. 2 an inverted plan view of the regulating cam; Fig. 3 a side elevation of the cam; Fig. 4 a partial development of the cam shown in Figs. 2 and 3; Fig. 5, a section on the line 5—5 of Fig. 1; Fig. 6, a detail elevational view of the handle operated sleeve; Fig. 7 a plan view of the sleeve shown in Fig. 6; Fig. 8 a plan view of the valve operating plate; Fig. 9 a section on the line 9—9 of Fig. 1; and Fig. 10 a plan view of the supply valve stem bushing.

As shown in the drawing, the brake valve device may comprise a casing 1 having a shouldered annular cavity for receiving a diaphragm 2. The diaphragm 2 is secured in position by a ring 3 which is clamped against the diaphragm by a cover or cap member 4 having screw-threaded engagement in the casing 1.

Bushings 5 and 6 are screwed into threaded openings at the under face of the casing 1 and mounted in the bushing 5 is an exhaust valve and stem 7 adapted to engage a valve seat provided in a fitting 8 which is screwed into the lower end of the bushing 5.

The valve 7 is provided with a collar 9 adapted to engage the under face of a flange 10 formed at the upper end of bushing 5. Interposed between the fitting 8 and the collar 9 is a coil spring 11.

Mounted in the bushing 6 is a supply valve operating stem 12 having its lower end extending into a central bore of a fitting 13 which has screw-threaded engagement in the lower end of bushing 6. The valve stem 12 is provided with a collar 14 adapted to engage the under face of a flange 15 formed at the upper end of bushing 6. Interposed between the fitting 13 and the collar 14 is a coil spring 16.

The fitting 13 is provided with a valve chamber 17 containing a supply valve 18 having a stem 19 adapted to engage in a central bore of the valve operating stem 12.

Engaging the upper ends of the stem 7 and the valve operating stem 12 is a plate 20 having a central concave depression in which the ball shaped end of a diaphragm member 21 engages.

Secured within an annular cavity in the cap member 4 is a ring shaped cam member 22 provided on its under face with two similar cam faces 23. Mounted in the cap 4 and extending through a central opening therein, is a sleeve 24 having an operating handle 25 secured at its upper end and having at its lower end oppositely extending wings 26, having inclined faces to engage the corresponding cam face 23 of the cam member 22.

Mounted in the interior of the sleeve 24 is a coil spring 27 which bears against the diaphragm 2 and secured to the cam ring 22 is a pair of oppositely arranged flat springs 28, each adapted to engage a corresponding wing 26 when the sleeve 24 is in its release position.

At the release end of each cam face 23 the cam ring 22 is provided with a pocket adapted to receive the corresponding wing 26, so that, as shown in Fig. 4, rotative movement of the ring 22 from release position, will first cause a quick axial movement of the wings 26 until said wings have been forced to a position in which their inclined faces engage the cam faces 23.

In operation, when the handle 25 is in release position, the wings 26 of the sleeve 24 engage in the corresponding pockets of the cam ring 22. If it is desired to apply the brakes, the handle 25 is operated to rotate the sleeve 24. The initial rotative movement first causes the wings 26 to ride out of the pockets in the cam ring to thereby effect a downward movement of the sleeve 24 and thus by acting on the upper end of the spring 27, said spring is initially compressed to a certain extent with a slight rotative movement of the handle 25.

It may be stated that the notch or pocket in the cam ring 22 provides an impositive lock tending to retain the brake valve handle in release position and at the same time provide a wide opening of the exhaust valve 7 in release position, which can be taken up so as to close the exhaust valve by a short preliminary movement of the handle required to move the wings 26 from the notch to the elevation of the cam surfaces 23, rendering the major portion of the stroke available for graduating the application of the brakes.

Further movement of the handle causes a more gradual axially downward movement of the sleeve 24, through the engagement of the wings 26 with the cam faces 23, and a corresponding further compression of the spring 27.

Since the spring 27 acts on the diaphragm 2, said diaphragm will be depressed or moved downwardly by the pressure of the spring. Preferably the spring 16 is somewhat lighter than the spring 11, so that the initial movement of the plate 20 by the diaphragm 2 operates, with the stem 7 acting as a fulcrum, to move the stem 12 until the lost motion between the stem 12 and the valve stem 19 is taken up. Then further movement of the stem 12 is resisted by both springs 16 and 32 and since the combined resistance of the springs 16 and 32 exceeds the resistance of spring 11, the plate 20 will now move, with the stem 12 acting as a fulcrum, about the pivot pin 21, so that said plate is rocked on the pivot pin 21 to depress the stem 7. The exhaust valve associated with stem 7 then moves to its seat. Further movement of diaphragm 2 then rocks the plate 20 with the stem 7 acting as a fulcrum, so as to operate stem 12 to open the supply valve 18.

Fluid under pressure is then supplied from valve chamber 17, which is connected by pipe 29 to a source of fluid under pressure, to diaphragm chamber 30. Said chamber is connected by pipe 31 to the brake cylinder or brake chamber, so that fluid under pressure is supplied thereto, to effect an application of the brakes. When the pressure in chamber 30 acting on diaphragm 2 slightly exceeds the opposing pressure of the spring 27, the diaphragm will be moved upwardly, so as to permit the valve 18 to be closed by the spring 32, since the combined pressures of the springs 16 and 32 will act on the plate 20, during the upward movement of said plate, so as to tilt the plate, with the stem 7 acting as a fulcrum and the member 21 acting as a pivot.

It will now be seen that both the supply valve 18 and the exhaust valve 7 are closed or lapped and the parts will remain in this position, so long as the pressure in the brake cylinder corresponds with the pressure to which the spring 27 is set.

If it is desired to release the brakes, the brake valve handle 25 is turned toward release position, so that a reduction in the compression of spring 27 is effected. This reduction in spring pressure on diaphragm 2 causes the higher brake cylinder pressure on the opposite side of the diaphragm to move the diaphragm upwardly, permitting the plate 20 to be tilted upwardly by the action of the spring 11 on the exhaust valve 7, with stem 12 acting as a fulcrum for said plate, thus permitting the exhaust valve to be unseated by the spring 11. Fluid under pressure in the brake cylinder will then be vented from the chamber 30 and the brake cylinder to the atmosphere, so as to effect the release of the brakes.

While the brakes are applied, the brake cylinder pressure may be increased by turning the handle 25 so as to further compress the spring 27, whereby the stem 12 is again operated by the downward movement of the diaphragm 2 so as to again open the supply valve 18. When the pressure in the brake cylinder and in diaphragm chamber 30 has been increased to correspond with the increased pressure of spring 27, the valve 18 will be again closed, in the manner hereinbefore described.

If leakage from the brake cylinder should occur while the handle 25 is in a given brake applying position, the reduced pressure of the brake cylinder in chamber 30 acting on diaphragm 2 will permit the spring 27 to operate the diaphragm 2, so as to open the supply valve 18 and admit fluid to the brake cylinder to compensate for the leakage.

When the handle 25 is in release position, the spring 27 is not under compression, and in order to hold the sleeve 24 and handle 25 against possible vibratory movement, the springs 28 are provided, said springs being adapted in release position, to bear against the wings 26 and thus hold the sleeve 24 in position by the engagement of the wings 26 in the pockets of the cam wing 22.

The exhaust valve 7 and the supply valve stem 12 being in non-rigid engagement with plate 20, there will be no forces acting on the valves tending to prevent accurate and tight seating of the valves.

Having now described my invention, what I claim as new and desire to secure by Letters Patent, is:—

1. In a fluid pressure controlling valve device, the combination with a movable abutment, an exhaust valve, and a separate fluid supply valve movable independently of the exhaust valve, of means operated by said abutment for first seating the exhaust valve while the supply valve is seated and for then unseating the supply valve while the exhaust valve remains seated.

2. In a fluid pressure controlling valve device, the combination with a movable abutment, a normally open exhaust valve, and a normally closed supply valve, of means engaging said valves and movable by said abutment relatively to said supply valve for closing the exhaust valve and then movable relatively to the exhaust valve for opening the supply valve.

3. In a fluid pressure controlling valve device, the combination with a movable abutment, a normally open exhaust valve, and a normally closed supply valve, of a spring for opposing the closing of the exhaust valve, a spring for opposing the opening of the supply valve, and a member pivotally associated with said abutment and engaging said valves for operating the valves upon movement of said abutment.

4. In a fluid pressure controlling valve device, the combination with a movable abutment, a normally open exhaust valve, and a normally closed supply valve, of a member pivotally associated with said abutment and engaging said valves, the supply valve acting as a fulcrum for said member for operating the exhaust valve upon movement of said abutment and the exhaust valve acting as a fulcrum for said member for operating said supply valve upon a further movement of said abutment.

5. In a fluid pressure controlling valve device, the combination with a flexible diaphragm, an adjustable spring acting on said diaphragm, an exhaust valve and a fluid supply valve, of a member engaging said valves and movable by said diaphragm upon compression of said spring and relatively to said supply valve for closing said exhaust valve and then relatively to said exhaust valve for opening said supply valve.

6. In a fluid pressure controlling valve device, the combination with a flexible diaphragm and valve means operated by said diaphragm for controlling the supply of fluid under pressure, of a spring acting on said diaphragm, a rotatable sleeve containing said spring, a member having a cam face, and an element associated with said sleeve and engaging said cam face and operable by movement on said face upon rotation of said sleeve for moving said sleeve to compress said spring.

7. In a fluid pressure controlling valve device, the combination with a casing, of a removable bushing secured in said casing, an exhaust valve operating stem contained in said bushing, a spring in said bushing acting on said valve stem, a second removable bushing secured in said casing, a fluid supply valve stem contained in said second bushing, a spring in said bushing, acting on said supply valve controlling stem, and means associated with said casing for operating said valve stems.

8. In a fluid pressure controlling valve device, the combination with a flexible diaphragm and means operated by said diaphragm for controlling the supply of fluid under pressure, of a spring acting on said diaphragm and means for varying the compression of said spring comprising a rotatable member engaging said spring, a cam device having a cam face adapted to be engaged by said member for gradually compressing said spring upon rotation of said member, and means for effecting a quick movement of said member and a sudden compression of said spring in advance of the engagement of said member with said cam face.

9. In a fluid pressure controlling valve device, the combination with a flexible diaphragm and means operated by said diaphragm for controlling the supply of fluid under pressure, of a spring acting on said diaphragm and means for varying the compression of said spring comprising a rotatable member engaging said spring, and a cam mechanism for first moving said member to rapidly compress said spring upon a small rotative movement of said member and for then gradually moving said member to gradually compress said spring upon a further rotative movement of said member.

10. In a fluid pressure controlling valve device, the combination with a flexible diaphragm and means operated by said diaphragm for controlling the supply of fluid under pressure, of a spring acting on said diaphragm and means for varying the compression of said spring comprising a rotatable member engaging said spring, a lug associated with said member, a cam device having a cam face adapted to be engaged by said lug upon rotative movement of said member, said cam device being provided with a recess adjacent to said cam face and in which said lug engages in the normal position of said member.

In testimony whereof I have hereunto set my hand.

LLOYD V. LEWIS.